(12) United States Patent
Hertzog et al.

(10) Patent No.: US 11,470,757 B2
(45) Date of Patent: Oct. 18, 2022

(54) PLOUGH

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Loftahammar (SE); Rickard Karl Gustav Nåhdin, Gamleby (SE)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 16/846,808

(22) Filed: Apr. 13, 2020

(65) Prior Publication Data

US 2020/0337206 A1  Oct. 29, 2020

(30) Foreign Application Priority Data

Apr. 25, 2019  (EP) .................................... 19171136

(51) Int. Cl.
*A01B 63/28* (2006.01)
*A01B 15/14* (2006.01)

(52) U.S. Cl.
CPC .............. *A01B 63/28* (2013.01); *A01B 15/14* (2013.01)

(58) Field of Classification Search
CPC ......... A01B 13/02; A01B 13/08; A01B 15/14; A01B 11/00; A01B 63/02
See application file for complete search history.

(56) References Cited

U.S. PATENT DOCUMENTS

| | | | | |
|---|---|---|---|---|
| 2,659,284 A | * | 11/1953 | Pursche ................. | A01B 3/464 172/321 |
| 2,760,420 A | * | 8/1956 | Pursche ................. | A01B 63/22 172/227 |
| 3,642,087 A | | 2/1972 | Sampey | |
| 4,413,685 A | | 11/1983 | Gremelspacher et al. | |
| 4,491,183 A | | 1/1985 | Anderson et al. | |

(Continued)

FOREIGN PATENT DOCUMENTS

| | | |
|---|---|---|
| CN | 105783839 | 7/2016 |
| CN | 109588075 A | 4/2019 |

(Continued)

OTHER PUBLICATIONS

Extended European Search Report for EP Application No. 19171136.5 dated Nov. 6, 2019 (22 pages).

(Continued)

*Primary Examiner* — Jessica H Lutz
(74) *Attorney, Agent, or Firm* — Rebecca L. Henkel; Rickard K. DeMille

(57) ABSTRACT

A plough comprising: a frame; a ground engaging tool that is connected to the frame; and an actuator mechanism that is configured to control a roll angle and/or a pitch angle of the frame. The plough also includes a controller that is configured to: receive ground-contour-data that is representative of contours of a field that the plough is to work; and determine an actuator-control-signal for the actuator mechanism based on the ground-contour-data, wherein the actuator-control-signal is for setting the roll angle and/or the pitch angle of the frame.

18 Claims, 8 Drawing Sheets

(56) References Cited

U.S. PATENT DOCUMENTS

| | | | |
|---|---|---|---|
| 4,679,633 A | 7/1987 | Kauss | |
| 4,775,940 A | 10/1988 | Nishida et al. | |
| 4,776,153 A | 10/1988 | DePauw et al. | |
| 5,060,205 A | 10/1991 | Phelan | |
| 5,430,651 A | 7/1995 | Nielsen et al. | |
| 5,488,817 A | 2/1996 | Paquet et al. | |
| 5,535,577 A | 7/1996 | Chmielewski et al. | |
| 5,621,666 A | 4/1997 | O'Neall et al. | |
| 5,669,452 A * | 9/1997 | Wright | A01B 35/04 172/624.5 |
| 5,711,139 A | 1/1998 | Swanson | |
| 5,794,421 A | 8/1998 | Maichle | |
| 6,076,611 A | 6/2000 | Rozendaal et al. | |
| 6,089,327 A | 7/2000 | Kimura et al. | |
| 6,131,919 A | 10/2000 | Lee et al. | |
| 6,164,385 A | 12/2000 | Buchi | |
| 6,216,794 B1 | 4/2001 | Buchi | |
| 6,222,628 B1 | 4/2001 | Gorallo et al. | |
| 6,305,478 B1 | 10/2001 | Friggstad | |
| 6,588,187 B2 | 7/2003 | Englestad et al. | |
| 6,698,524 B2 * | 3/2004 | Bernhardt | A01B 15/14 172/7 |
| 6,813,873 B2 | 11/2004 | Allwörden et al. | |
| 6,990,390 B2 | 1/2006 | Groth et al. | |
| 7,028,554 B2 | 4/2006 | Adamchuk et al. | |
| 7,063,167 B1 | 6/2006 | Staszak et al. | |
| 7,540,129 B2 | 6/2009 | Kormann | |
| 7,540,130 B2 | 6/2009 | Coers et al. | |
| 7,748,264 B2 | 7/2010 | Prem | |
| 7,866,671 B2 | 1/2011 | Madler | |
| 7,870,709 B2 | 1/2011 | Digman | |
| 8,090,507 B2 * | 1/2012 | Yegerlehner | A01B 13/08 172/4 |
| 8,573,319 B1 | 11/2013 | Casper et al. | |
| 8,720,170 B2 | 5/2014 | Deneault et al. | |
| 8,751,147 B2 | 6/2014 | Colwell | |
| 8,752,642 B2 | 6/2014 | Whalen et al. | |
| 8,827,001 B2 | 9/2014 | Wendte et al. | |
| 8,843,283 B2 | 9/2014 | Strelioff et al. | |
| 8,857,530 B2 | 10/2014 | Henry | |
| RE45,303 E | 12/2014 | Henry et al. | |
| 8,977,441 B2 | 3/2015 | Grimes et al. | |
| 9,026,321 B2 | 5/2015 | Henry et al. | |
| 9,301,439 B2 | 4/2016 | Gilstring | |
| 9,351,443 B2 | 5/2016 | Miller et al. | |
| 9,405,039 B2 * | 8/2016 | Anderson | A01B 79/00 |
| 9,481,294 B2 | 11/2016 | Sander et al. | |
| 9,510,498 B2 | 12/2016 | Tuttle et al. | |
| 9,516,802 B2 | 12/2016 | Zemenchik | |
| 9,554,098 B2 | 1/2017 | Casper et al. | |
| 9,554,504 B2 | 1/2017 | Houck | |
| 9,585,298 B2 | 3/2017 | Henry et al. | |
| 9,585,307 B2 | 3/2017 | Holland | |
| 9,693,496 B2 | 7/2017 | Tevs et al. | |
| 9,706,696 B2 * | 7/2017 | Gschwendtner | F16H 61/425 |
| 9,750,174 B2 | 9/2017 | Sauder et al. | |
| 9,801,329 B2 | 10/2017 | Zielke | |
| 9,861,022 B2 | 1/2018 | Bassett | |
| 9,980,422 B2 | 5/2018 | Czapka et al. | |
| 10,045,474 B2 | 8/2018 | Bachman et al. | |
| 10,104,822 B2 * | 10/2018 | Couchman | G05D 1/0278 |
| 10,123,475 B2 | 11/2018 | Posselius et al. | |
| 10,178,823 B2 | 1/2019 | Kovach et al. | |
| 10,219,421 B2 | 3/2019 | Achen et al. | |
| 2010/0017075 A1 | 1/2010 | Beajuot | |
| 2012/0227992 A1 | 9/2012 | Henry | |
| 2013/0068489 A1 | 3/2013 | Blunier et al. | |
| 2015/0023736 A1 * | 1/2015 | Gierman | E02F 5/102 405/154.1 |
| 2016/0029547 A1 | 2/2016 | Casper et al. | |
| 2017/0064900 A1 | 3/2017 | Zemenchik | |
| 2017/0105331 A1 | 4/2017 | Herlitzus et al. | |
| 2017/0251587 A1 | 9/2017 | Sporrer et al. | |
| 2018/0114305 A1 | 4/2018 | Strnad et al. | |
| 2018/0153088 A1 | 6/2018 | Sporrer et al. | |
| 2018/0220577 A1 | 8/2018 | Posselius et al. | |
| 2018/0279543 A1 | 10/2018 | Kovach | |
| 2018/0299422 A1 | 10/2018 | Pregesbauer | |
| 2018/0303022 A1 | 10/2018 | Barrick et al. | |
| 2018/0310465 A1 | 11/2018 | Peterson et al. | |
| 2018/0310466 A1 | 11/2018 | Kovach et al. | |
| 2018/0340845 A1 | 11/2018 | Rhodes et al. | |
| 2019/0008088 A1 | 1/2019 | Posselius et al. | |
| 2019/0059198 A1 | 2/2019 | Schnaider et al. | |
| 2019/0235529 A1 | 8/2019 | Barrick et al. | |
| 2019/0246548 A1 | 8/2019 | Kovach et al. | |
| 2020/0000005 A1 | 1/2020 | Stanhope et al. | |
| 2020/0060062 A1 | 2/2020 | Sporrer et al. | |
| 2020/0084954 A1 | 3/2020 | Sporrer et al. | |
| 2020/0100419 A1 | 4/2020 | Stanhope | |
| 2020/0337206 A1 * | 10/2020 | Hertzog | A01B 3/464 |
| 2021/0045280 A1 * | 2/2021 | Ehlert | A01B 63/28 |
| 2021/0298215 A1 | 9/2021 | Kovach | |
| 2021/0298216 A1 | 9/2021 | Kovach | |
| 2021/0298217 A1 | 9/2021 | Kovach | |
| 2021/0298218 A1 | 9/2021 | Kovach | |
| 2021/0298221 A1 | 9/2021 | Kovach | |
| 2021/0298222 A1 | 9/2021 | Kovach | |

FOREIGN PATENT DOCUMENTS

| | | |
|---|---|---|
| EP | 1273216 | 1/2003 |
| EP | 3305052 A1 | 4/2018 |
| JP | H02167004 A | 6/1990 |
| JP | 2969808 | 11/1999 |
| JP | H11321634 | 11/1999 |
| JP | 2002165510 | 6/2002 |
| JP | 2005095045 | 4/2005 |
| WO | 2017158006 | 9/2017 |
| WO | WO2017197274 | 11/2017 |
| WO | WO2018018050 | 1/2018 |

OTHER PUBLICATIONS

EP Application No. 21165022.1, Search Report dated Aug. 6, 2021, 8 pgs.

EP Application No. 21165029.6, Search Report dated Aug. 6, 2021, 7 pgs.

EP Application No. 21165028.8, Search Report dated Aug. 9, 2021, 14 pgs.

EP Application No. 21165025.4, Search Report dated Aug. 6, 2021, 9 pgs.

EP Application No. 21165028.8 Extended Search Report, dated Dec. 10, 2021, 13 pgs.

Gilliot et al., "Soil Surface Roughness Measurement: A New Fully Automatic Photogrammetric Approach Applied To Agricultural Bare Fields," Computers and Electronics in Agriculture, Jan. 23, 2017, pp. 63-78, Elsevier, https://www.researchgate.net/publication/312651105_Soil_surface_roughness_measurement_A_new_fully_automatic_photogrammetric_approach_applied_to_agricultural_bare_fields.

Hart-Carter Co., "Automatic Header Adjustment," Farm Show Magazine, 1984, p. 33, vol. 8, Issue #6.

Raper et al., "A Portable Tillage Profiler for Measuring Subsoiling Disruption," American Society of Agricultural Engineers, 2004, pp. 23-27, vol. 47(1), https://www.ars.usda.gov/ARSUserFiles/60100500/csr/ResearchPubs/raper/raper_04a.pdf.

Yasin et al., "Non-Contact System for Measuring Tillage Depth," Computers and Electronics in Agriculture, 1992, pp. 133-147, https://www.researchgate.net/publication/229318888_Non-contact_system_for_measuring_tillage_depth.

Peieinatos et al., "Precision Harrowing With a Flexible Tine Harrow and an Ultrasonic Sensor," Jul. 2015, Precision Agricultural, pp. 579-586, https://www.researchgate.net/publication/281437517_Precision_harrowing_with_a_lexible_tine_harrow_and_an_ultrasonic_sensor.

"Tiger-Mate® 255 Field Cultivator," 2017, Case IH Agriculture, 24 pgs.

(56) References Cited

OTHER PUBLICATIONS

"Ecolo-Tiger® 875 Disk Ripper," 2018, Case IH Agriculture, 16 pgs.

* cited by examiner

PLOUGH

BACKGROUND OF THE INVENTION

The present disclosure relates to an agricultural plough and a method of operating a plough.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are in a laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased and the plough bodies are raised, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees (i.e. reversed) with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated (reversed) between the first and second configuration, particularly during turning manoeuvres on the headlands. Whenever the plough is reversed, the first and second set of plough bodies swap position.

In reversible ploughs, a means of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough.

SUMMARY OF THE INVENTION

Aspects and embodiments of the disclosure provide an agricultural implement as claimed in the appended claims.

According to one aspect of the current disclosure, there is provided a plough comprising:
 a frame;
 a ground engaging tool that is connected to the frame;
 an actuator mechanism that is configured to control a roll angle and/or a pitch angle of the frame; and
 a controller that is configured to:
  receive ground-contour-data that is representative of contours of a field that the plough is to work; and
  determine an actuator-control-signal for the actuator mechanism based on the ground-contour-data, wherein the actuator-control-signal is for setting the roll angle and/or the pitch angle of the frame.

Advantageously, use of such a controller and actuator mechanism can enable a ploughing operation to be improved. For example in terms of enabling the ground engaging tools to penetrate the soil with a consistent depth, thereby resulting in better furrows.

The actuator-control-signal may be for setting the roll angle and/or the pitch angle of the frame such that it is aligned with the ground that it is processing.

The actuator mechanism may be configured to set the orientation of the frame relative to a vehicle that is driving the plough. The controller may be configured to determine the actuator-control-signal also based on vehicle-orientation-data that is representative of the orientation of the vehicle. The vehicle-orientation-data may be representative of the roll angle and/or pitch angle of the vehicle.

The actuator mechanism may include one or more of:

a depth-wheel-adjustable-linkage that is configured to vary the height of a rear portion of the frame relative to the ground surface;

a tractor-adjustable-linkage that is configured to vary the height of a front region of the frame relative to the ground surface; and a turning actuator that is configured to set the roll angle of the frame.

The ground-contour-data may comprise one or both of:

lateral-contour-data that is representative of lateral contours of the ground that is to be processed by the plough, or is already being processed by the plough; and longitudinal-contour-data that is representative of longitudinal contours of the ground that is to be processed by the plough, or is already being processed by the plough.

One or both of the lateral-contour-data and the longitudinal-contour-data may comprise averaged contour data. The lateral-contour-data may comprise averaged contour data, that is averaged over the width of the plough. The longitudinal-contour-data may comprise averaged contour data, that is averaged over the length of the plough.

The ground-contour-data may comprise sensed-contour-data that is representative of sensed parameters that are generated by one or more sensors.

The ground-contour-data may comprise a sensed-contour-distance-offset that is representative of a distance between (i) the location of the ground contours that are identified by the ground-contour-data; and (ii) a predetermined part of the plough.

The controller may be configured to:

receive a plough-speed-value, which is representative of a speed of the plough; and provide the actuator-control-signal to the actuator mechanism at an instant in time that is based on the sensed-contour-distance-offset and the plough-speed-value.

The ground-contour-data may comprise stored-contour-data that is representative of ground contour information that is stored in memory.

The ground-contour-data may comprise contour-location-data that is representative of the location of the ground contours that are identified by the ground-contour-data.

The controller may be configured to:

receive plough-location-data that is representative of the location of the plough in the field; and provide the actuator-control-signal to the actuator mechanism based on a comparison of the plough-location-data and the contour-location-data.

There may be provided a computer-implemented method of operating a plough, the plough comprising:

a frame;

a ground engaging tool that is connected to the frame; and an actuator mechanism that is configured to control a roll angle and/or a pitch angle of the frame;

wherein the method comprises:

receiving ground-contour-data that is representative of contours of a field that the plough is to work; and determining an actuator-control-signal for the actuator mechanism based on the ground-contour-data, wherein the actuator-control-signal is for setting the roll angle and/or the pitch angle of the frame.

The actuator-control-signal may be for setting the roll angle and/or the pitch angle of the frame such that it is aligned with the ground that it is processing.

The at least one ground engaging tool may be a plough body.

The agricultural implement may be a reversible plough.

There may be provided an agricultural machinery comprising an agricultural vehicle and any plough disclosed herein. The plough may be connected to the front or the rear of the agricultural vehicle.

There may be provided a computer program, which when run on a computer, causes the computer to configure any apparatus, including a controller, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
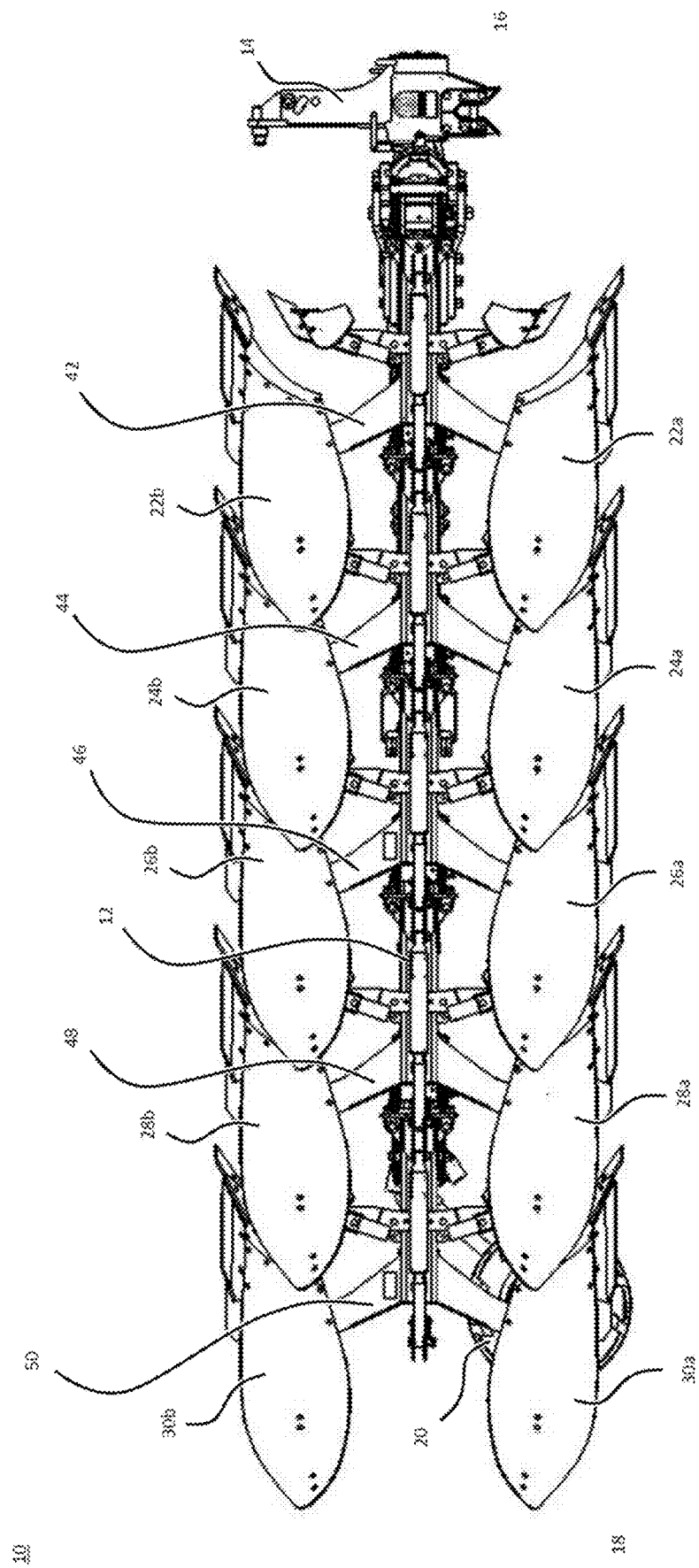
FIG. 1A shows a right-side view of an agricultural implement with fixed ground engaging tools.
Figure 1B:
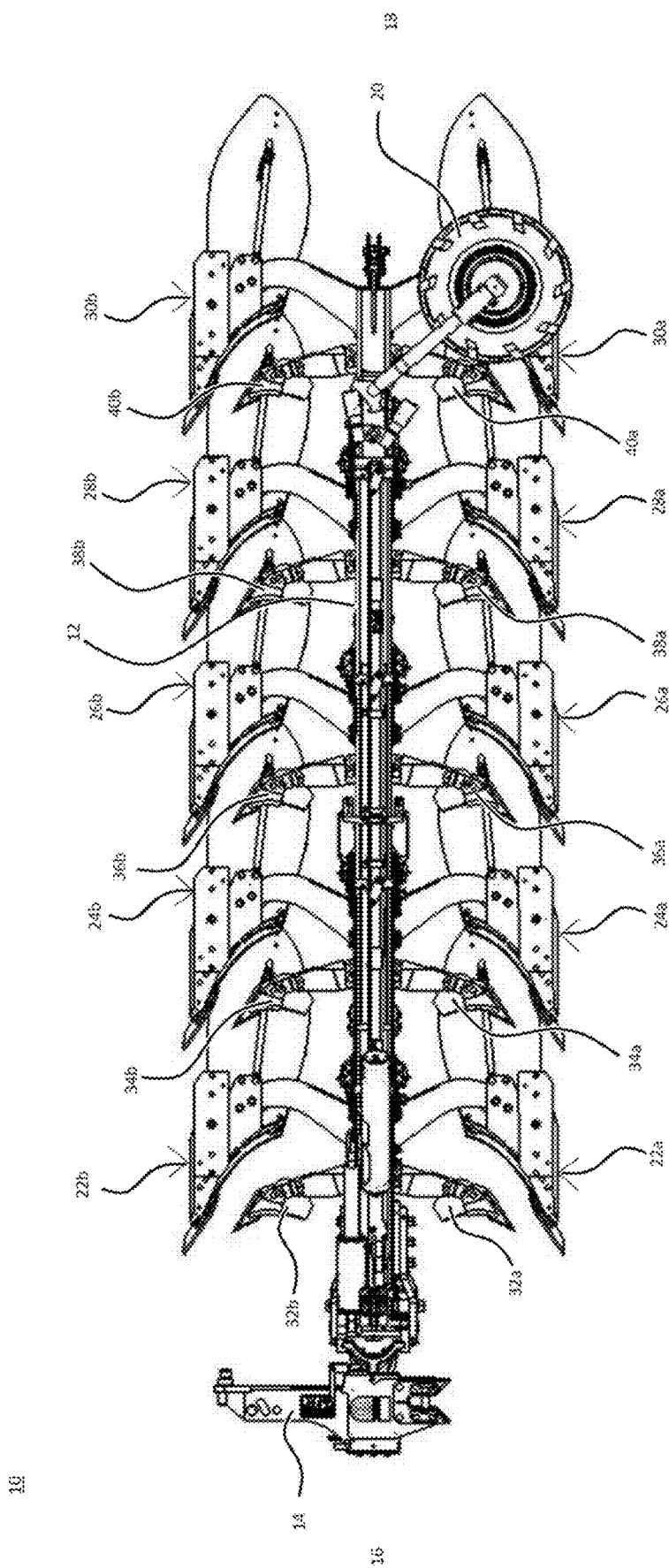
FIG. 1B shows a left-side view of the agricultural implement shown in FIG. 1A.
Figure 1C:
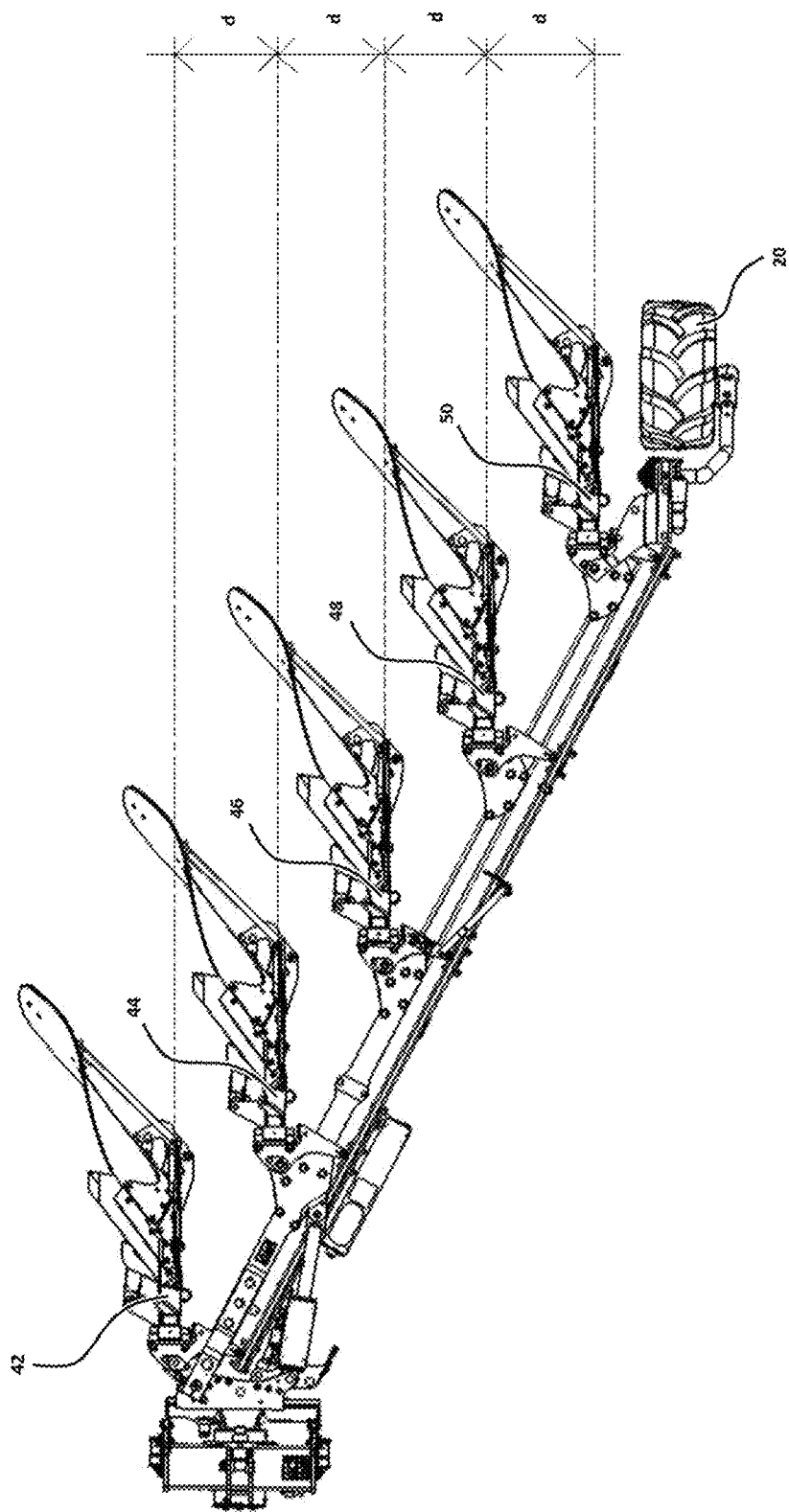
FIG. 1C shows a plan view of the agricultural implement shown in FIG. 1A.

FIGS. 1A to 1C show various views of an agricultural implement, particularly a plough 10. As will be described in more detail below, the plough 10 shown in FIGS. 1A to 1C is a reversible plough.

The plough 10 comprises a main frame 12. The main frame 12 may be a rectangular or round tube extending between a headstock 14 at a front end 16 of the plough towards a depth wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 2:
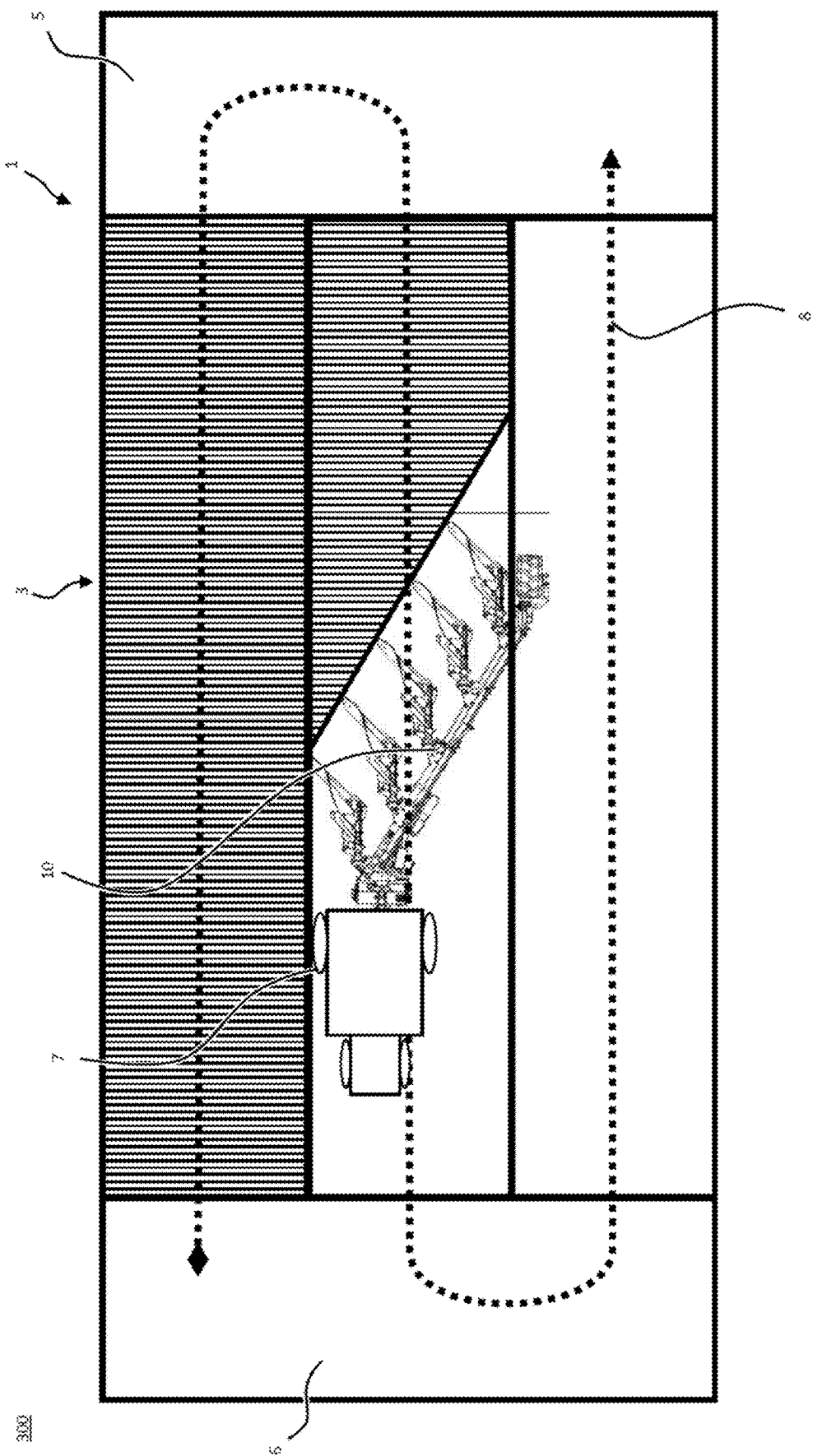
FIG. 2 shows a schematic representation of the trajectory of an agricultural machinery within a work area.

Turning to FIG. 2, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 2 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 2, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

Figure 4:
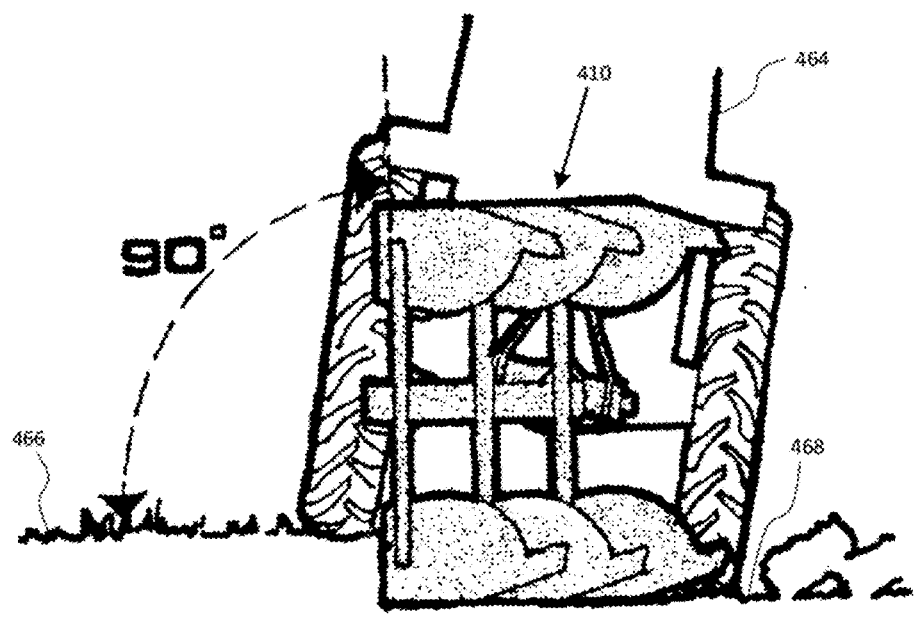
FIG. 4 illustrates schematically, from behind, a ploughing operation that is being performed "in-furrow"

During the turning movement on the headlands, the plough 10 is also reversed. That is, the main frame 12 is rotated by about 180 degrees with respect to the headstock 14 to move the plough from a first configuration to a second configuration. It will be appreciated that if the operator is ploughing in the furrow (as shown in FIG. 4), then the main frame 12 may not be rotated by exactly 180 degrees, it is more likely to be 190-200 degrees or 160-170 degrees depending on which direction the main frame 12 turns. If operator is ploughing on-land, then the main frame 12 may be rotated by an angle that is closer to 180 degrees, perhaps exactly 180 degrees.

In its first configuration shown in FIGS. 1A to 1C, the plough 10 is set up such that plough bodies 22a, 24a, 26a, 28a, and 30a of each of the pairs are in contact with the soil. This first configuration is shown in FIG. 2 and sometimes referred to as the "right turning configuration", since the mouldboards of the plough bodies 22a, 24a, 26a, 28a and 30a are arranged to move the soil sideways from left to right when viewed in the direction of travel. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are arranged to the right of the tractor (not shown). It follows that the second configuration is also referred to as the "left turning configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 10.

As the reversible plough 10 reaches the end of the first run, the main frame 12 is rotated by 180 degrees (reversed) with respect to the headstock 14. A turning cylinder (not shown), attached to the headstock 14 may be used to rotate (reverse) the plough 10. During rotation of the main frame, the first plurality of plough bodies, e.g. 22a, 24a, 26a, 28a, 30a, are transferred to the top of the plough 10. At the same time, the second plurality of plough bodies e.g. 22b, 24b, 26b, 28b, 30b, which were not in use in the previous run, is then transferred to the lower end of the plough 10 and will be submerged in the soil during the next run. The reversible plough is then in its second configuration (not shown). The headstock 14 can include two mechanical stops (not shown) that define end positions for the rotation of the main frame as it switches between the first and second configurations. In this way, the two mechanical stops define the roll angle of the main frame 12 relative to the headstock 14 in the first and the second configurations respectively. As is known in the art, the roll angle of the main frame 12 represents the degree of rotation about a longitudinal axis of the main frame 12. The roll angle of the main frame when the plough is in the first and second configurations can be adjusted by adjusting the physical location of the mechanical stops on the headstock 14.

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough 10 the main frame 12 is supported by a depth wheel 20. The depth wheel 20 is arranged at the back end 18 of the plough 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes depth wheel 20, which acts as a depth wheel to adjust the ground clearance of the main frame 12. An adjustable linkage 62 provided between the depth wheel 20 and the main frame 12 allows the operator to lift or lower the main frame 12 with respect to a ground surface. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by adjusting the link between the depth wheel 20 and the main frame 12, then the working depth of the plurality of first ground engaging tools shown in FIGS. 1A to 1C is increased, i.e. the plurality of first ground engaging tools are lowered further into the soil. If, on the other hand, the main frame 12 is lifted, then the working depth of the plurality of first ground engaging tools is decreased, i.e. the plurality of first ground engagement tools are raised.

It can be advantageous for the main frame 12 to be parallel with the ground while the plough 10 is working a field. The main frame 12 can be considered to have a pitch angle and a roll angle. The pitch angle represents the degree of slope between the front and the back of the main frame 12, along the length of the main frame 12. If the front of the main frame 12 (near the headstock 14) is higher than the back of the main frame 12 (near the depth wheel 20) relative to the ground, then the plough bodies at the back of the main frame 12 will penetrate the soil deeper than the plough bodies at the front of the main frame 12. Therefore, for a single pass of the plough, this will result in different furrows having different depths, which is undesirable.

Also, it can be undesirable for the roll angle of the main frame 12 to be offset from the angle of the ground that is being processed by the plough 10. For instance, if the roll angle of the main frame 12 is not aligned with the angle of the ground then different parts of the plough bodies will penetrate the soil to different depths. This can result in uneven furrows and/or damage to components of the plough body.

Figure 3:
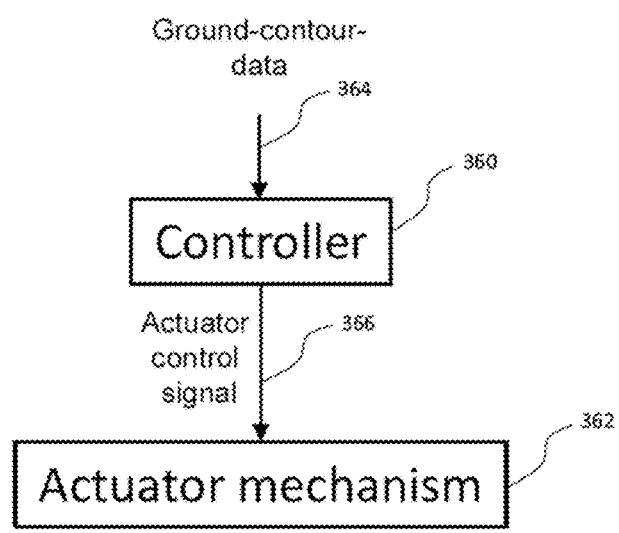
FIG. 3 schematically shows part of a plough, that includes a controller and an actuator mechanism.

FIG. 3 schematically shows part of a plough, that includes a controller 360 and an actuator mechanism 362. The plough also includes the following components that are not shown in FIG. 3: a frame, and a ground engaging tool (such as a plough body or a skimmer) that is connected to the frame. The actuator mechanism 362 is for controlling the roll angle and/or the pitch angle of the frame. Example implementations of the actuator mechanism 362 are described below.

The controller 360 receives ground-contour-data 364 that is representative of contours of a field in which the plough is working. As will be described below, the ground-contour-data 364 can be received from sensors that monitor the contours of portions of the field that are still to be ploughed. Alternatively or additionally, the ground-contour-data 364 can be retrieved from memory. For instance, ground-contour-data 364 may have been stored in memory as part of an earlier operation in the field. The earlier operation may have been a ploughing operation, any other agricultural operation, or a specific reconnaissance operation. As a yet further example, the ground-contour-data 364 may be determined from existing mapping data, such as Ordnance Survey mapping data that is available for the UK.

The controller 360 determines an actuator-control-signal 366 for the actuator mechanism based on the ground-contour-data 364. The actuator-control-signal 366 is for setting the roll angle and/or the pitch angle of the frame, and can be used to ensure that the frame is aligned with the ground over which it is passing. This can be aligned in terms of pitch angle and/or roll angle.

FIG. 4 illustrates schematically, from behind, a ploughing operation that is being performed "in-furrow" on a field in which the unploughed land is horizontal. In this illustration a tractor 464 is towing a reversible plough 410. The right-hand wheels of the tractor 464 are moving through furrows 468 that have already been ploughed by a previous run through the field. The left-hand wheels of the tractor 464 are moving over unploughed land/field 466. Therefore, as shown in the figure, the left hand-side of the tractor 464 is higher than the right-hand side such that the tractor 464 has a degree of roll that is offset from the unploughed field 466. However, since the unploughed field is level/horizontal (that is, it does not have any significant contours), the roll angle and pitch angle of the plough 410 should also be level/horizontal such that it is properly aligned with the unploughed field and the ploughing operation can be consistent. Therefore, as also shown in FIG. 4, the plough 410 has a roll angle that is offset from that of the tractor 464 such that the plough 410 is aligned with the unploughed field 466. This offset between the roll angle of the tractor 464 and the roll angle of the plough 410 could be set by an operator manually adjusting the position of one of the mechanical stops that define the end positions for the rotation of the plough as it switches between the first and second configurations. However, according to aspects of the present disclosure, advantageously a controller (not shown) can receive ground-contour-data that indicates that the unploughed field is level/horizontal, and provide an actuator-control-signal to the actuator mechanism such that the roll angle of the plough 410 is aligned with the unploughed field.

In some examples, the actuator mechanism can set the orientation of the frame of the plough 410 relative to the tractor 464. Therefore, it can be beneficial for the controller to take the current roll angle and/or the pitch angle of the tractor into account when determining the actuator-control-signal. For instance, the controller can determine the actuator-control-signal 366 also based on vehicle-orientation-data that is representative of the orientation of the tractor (or other vehicle that is driving the plough—for example pushing or towing the plough). The vehicle-orientation-data can be representative of the roll angle and/or pitch angle of the tractor, and can be relative to the plough or the surface of the earth (for example using accelerometers or gyroscopes). The controller can determine a pitch-offset and/or a roll-offset based on the vehicle-orientation-data, and can determine the actuator-control-signal 366 such that it includes the pitch-offset and/or the roll-offset with the result that the actuator mechanism sets the frame of the plough such that it is aligned with the unploughed field that is to be processed by the plough.

Figure 5:
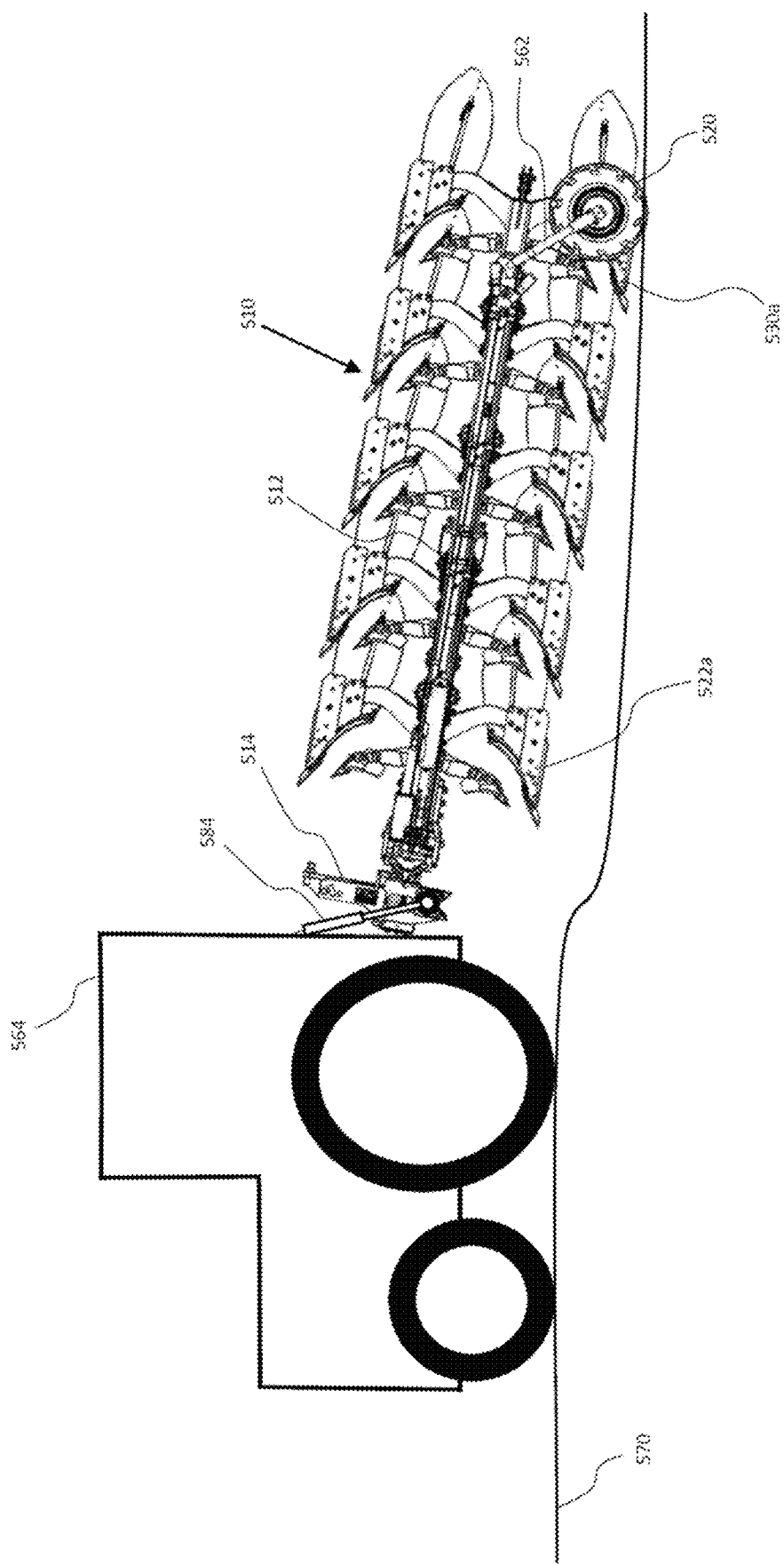
FIG. 5 illustrates schematically, from the side, a ploughing operation that involves a tractor towing a reversible plough.

FIG. 5 illustrates schematically, from the side, a ploughing operation that involves a tractor 564 towing a reversible plough 510. As can be seen from FIG. 5, the ground surface 570 on which the tractor 564 and the plough 510 are working is not flat. In particular, in this example the tractor 564 has gone up an incline such that the tractor 564 is driving along land that is higher than the land that the plough 510 is above. More particularly, since the depth wheel 520 at the rear of the plough 510 is on land that is at a different height/altitude than the land that is supporting the wheels of the tractor 564, the plough frame 512 has a pitch angle that is not aligned with the ground underneath the plough 510. This results in a first plough body 522a being at a height (or depth), relative to the surface of the ground, that is different to that of a fifth plough body 530a. As discussed above, this can result in sub-optimal ploughing. According to aspects of the present disclosure, advantageously an actuator mechanism can be used to control the pitch angle of the frame 512 based on an actuator-control-signal received from a controller (not shown).

One example of such an actuator mechanism is a depth-wheel-adjustable-linkage 562 that connects the depth wheel 520 and the frame 512. The length of the depth-wheel-adjustable-linkage 562 can be changed in order to vary the height of a rear portion of the frame 512 relative to the ground surface 570. In this example, the depth-wheel-adjustable-linkage includes a depth-wheel-cylinder. In this way, adjusting the depth-wheel-adjustable-linkage 562 can set the pitch angle of the frame 512, as well as the depth of the plough bodies 522a, 530a.

Another example of an actuator mechanism is a tractor-adjustable-linkage 584 that connects the tractor 564 to the headstock 514 (and hence indirectly connects the tractor 564 to the frame 512). The length of the tractor-adjustable-linkage 584 can be changed in order to vary the height of a front region of the frame 512 relative to the ground surface 570. In this example, the tractor-adjustable-linkage 584 includes a lift-cylinder. In this way, adjusting the tractor-adjustable-linkage 584 can set the pitch of the frame 512, as well as the depth of the plough bodies 522a, 530a.

Figure 6A:
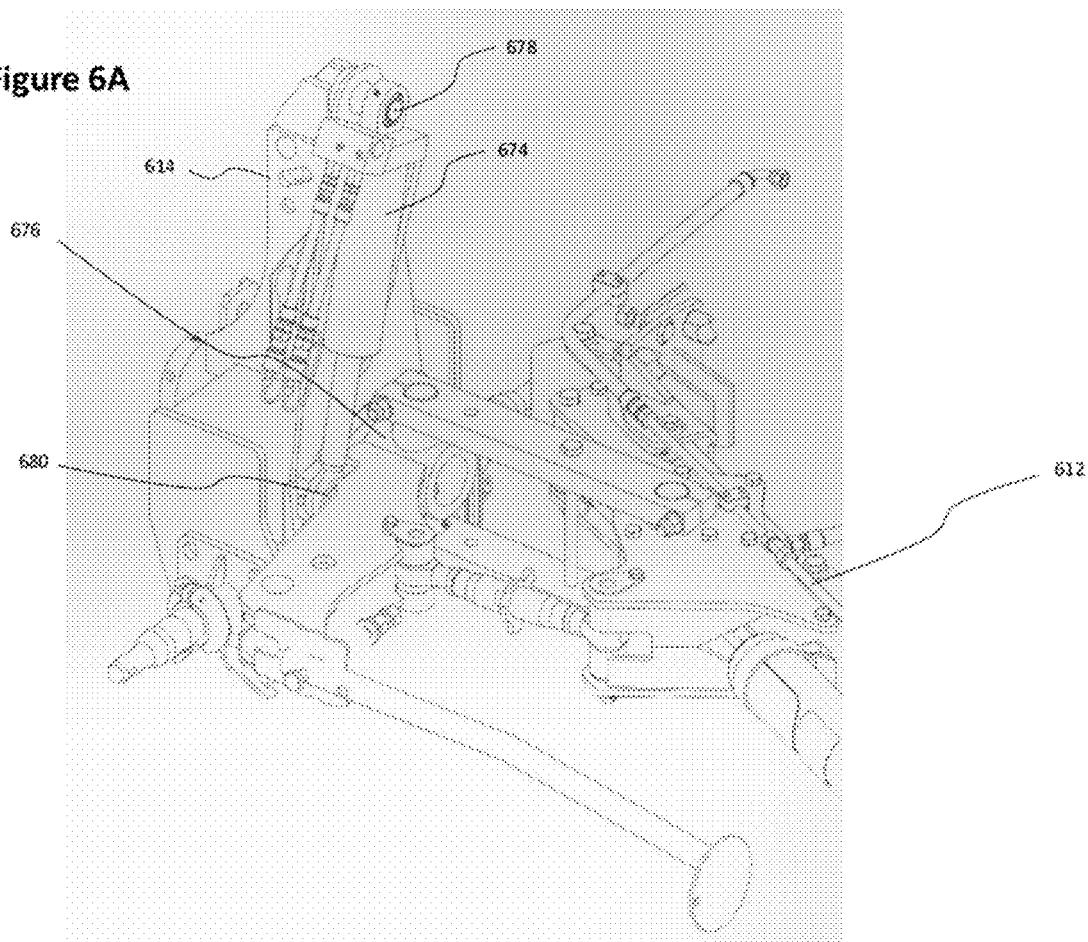
FIG. 6A illustrates the headstock of a reversible plough in a first configuration (right turning configuration)
Figure 6B:
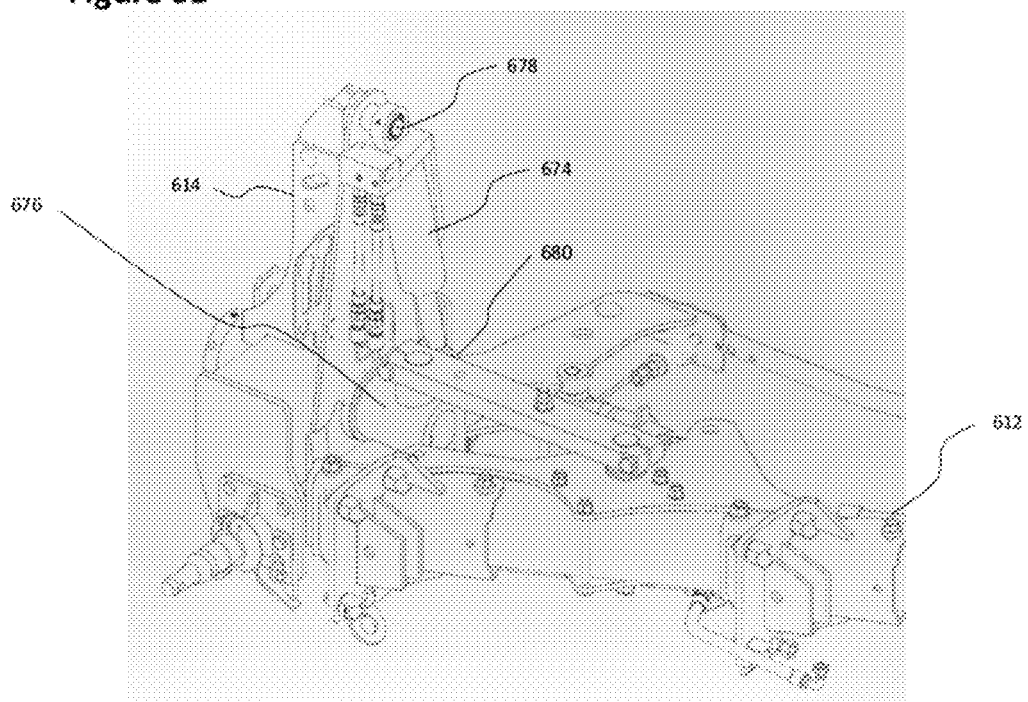
FIG. 6B illustrates the headstock of FIG. 6A when the reversible plough is in a second configuration (left turning configuration)

FIG. 6A illustrates the headstock 614 of a reversible plough in a first configuration (right turning configuration). FIG. 6B illustrates the same headstock 614 of the reversible plough in a second configuration (left turning configuration). FIG. 6A shows the frame 612 of the plough extending away from the headstock 614.

The headstock 614 includes a turning cylinder 674 that is used to rotate (reverse) the plough 610. One end of the cylinder 674 is connected to the headstock 614 at a cylinder-headstock-connection point 678. The other end of the cylinder 674 is connected to the frame 612 (either directly or indirectly) at a cylinder-frame-connection point 680. Also, the frame 612 is rotatably connected to the headstock 614 at a frame-headstock-connection point 676. The frame-headstock-connection point 676 is offset on the plough from the cylinder-frame-connection point 680 such that extension and contraction of the cylinder 674 causes the cylinder-frame-connection point 680 to rotate about the frame-headstock-connection point 676, which also causes the entire plough to rotate about a longitudinal axis of the plough. This movement of the cylinder-frame-connection point 680 can be used to change the configuration of the plough 610 from the first configuration to the second configuration, and vice versa.

In one or more of the examples disclosed herein, the turning cylinder 674 can be used as an actuator mechanism that sets the roll angle of the frame 612 based on ground contour data. In such examples, a pump (not shown) can be used to provide pressurised fluid to the turning cylinder 674 such that it rotates the frame 612 about the frame-headstock-connection point 676 until it has a defined roll angle with respect to the tractor. More generally, the turning cylinder 674 is an example of a turning actuator. As discussed herein, a controller can process one or more types of control-data to determine the defined roll angle.

Returning to FIG. 3, examples of ground-contour-data 364 can include one or both of the following:

lateral-contour-data that is representative of lateral contours of the ground that is to be processed by the plough, or is already being processed by the plough; that is contours that are transverse to the direction of travel of the plough. The controller 360 can determine an actuator-control-signal 366 for setting the roll angle of the frame based on the lateral-contour-data.

longitudinal-contour-data that is representative of longitudinal contours of the ground that is to be processed by the plough, or is already being processed by the plough; that is contours that are parallel to the direction of travel of the plough. The controller 360 can determine an actuator-control-signal 366 for setting the pitch angle of the frame based on the longitudinal-contour-data.

One or both of the lateral-contour-data and the longitudinal-contour-data may comprise averaged contour data, for instance averaged over the width of the plough (for the lateral-contour-data) or averaged over the length of the plough (for the longitudinal-contour-data). This can be used to improve the ploughing operation for the majority of the plough bodies on the plough and result in overall good control of the actuator mechanism 362 such that it is not adjusted too frequently. Also, using such an averaged value can be considered as looking forward to determine if any unevenness lasts for sufficiently long to warrant changing the roll angle and/or pitch angle of the frame.

More particularly, in one example the controller 360 can determine a plough-plane which represents the orientation of the plough. The plough-plane can be a plane that interests predetermined parts of a plurality of the plough bodies, optionally all of the plough bodies. The predetermined parts of a plurality of the plough bodies can be a lower edge of shares on the plough bodies. The controller 360 can be configured such that it processes the ground-contour-data and a representation of the plough-plane in order to provide an actuation-control-signal 366 that reduces (or minimizes or sets to a level that is below a threshold) the difference between one or more vectors that are associated with the plough-plane and the current average contour of the field. The one or more vectors may be normal vectors that are placed on the plough-plane, and the actuation-control-signal 366 may be for adjusting the roll angle and/or the pitch angle of the frame such that the vectors are kept perpendicular to a current average contour of the field.

In some examples, the ground-contour-data can include sensed-contour-data that is representative of sensed parameters that are generated by one or more sensors.

In some examples, the one or more sensors can be located on a tractor (or other agricultural vehicle) that is pushing or pulling the plough. In this way, the sensed-contour-data represents contours of the ground relative to the orientation of the tractor. For instance, if the tractor is ploughing "in-furrow" (as shown in FIG. 4), the roll of the tractor is automatically taken into account by the sensors and the orientation of the frame of the plough relative to the tractor can be set such that it is aligned with the sensed contours.

In other examples, the one or more sensors can be located on the plough itself. In which case, the sensed-contour-data represents contours of the ground relative to the orientation of the plough.

The sensors can be associated with the tractor (or other agricultural work vehicle) or the plough itself. The sensors may include optical sensors, RADAR sensors, LIDAR sensors, or any other sensors that can determine contours of the ground. Such sensors can take images of the ground profile, or reflect signals off of the ground, to determine the contours of the ground surface. The sensors can be positioned such that they face forwards in front of the plough/tractor. Alternatively or additionally, the sensors can be positioned such that they face sideways from the plough/tractor, in which case the sensors can monitor the ground that will be worked in a parallel working row in the field.

In some examples, the controller 360 can determine and use plough-location-data when providing the actuator-control-signal 366 to the actuator mechanism 362. For instance, a sensor may provide ground-contour-data 364 that is associated with contour-location-data. As the name suggests, the contour-location-data is representative of the location of the ground contours that are identified by the ground-contour-data 364. In some examples, the plough-location-data and the contour-location-data can be GPS data. The controller 360 may determine actuator-control-signals for the received ground-contour-data 364, and associate target-plough-location-data with the determined actuator-control-signals, whereby the target-plough-location-data is based on the contour-location-data. The target-plough-location-data may be the same as the contour-location-data in some examples. In other examples, the controller may apply an offset (for example to account for physical properties of the plough) to the contour-location-data when determining the target-plough-location-data. The controller 360 may receive live plough-location-data while the plough is working a field, and may identify corresponding target-plough-location-data based on the live plough-location-data. Then, the controller 360 may provide the actuator-control-signal that is associated with the identified corresponding target-plough-location-data to the actuator mechanism 362.

More generally, the controller 360 can receive plough-location-data that is representative of the location of the plough in the field; and provide the actuator-control-signal 366 to the actuator mechanism 362 based on a comparison of the plough-location-data and the contour-location-data.

In some examples, the controller 360 can determine and use a time-offset when providing the actuator-control-signal 366 to the actuator mechanism 362. For instance, a sensor may be providing ground-contour-data 364 that is representative of ground contours at a known distance in front of the plough; that is, the ground-contour-data 364 may comprise a sensed-contour-distance-offset that is representative of a distance between (i) the location of the ground contours that are identified by the ground-contour-data 364; and (ii) a predetermined part of the plough, such as the front of the plough or a region that is midway along the length of the frame. In which case, the controller 360 may determine a time-offset using a plough-speed-value, which represents the speed of the plough. For instance, the controller 360 may determine the time-offset by dividing the sensed-contour-distance-offset by the plough-speed-value. Then, the controller 360 can apply a time delay that corresponds to the determined time-offset between receiving an instance of the ground-contour-data 364 and providing the actuator-control-signal 366 that is based on that instance of the ground-contour-data. In this way, the controller 360 can provide the actuator-control-signal 366 to the actuator mechanism 362 at an instant in time that is based on the sensed-contour-distance-offset and the plough-speed-value. Advantageously, this can apply a delay between sensing the contours of the ground and activating the actuator mechanism 362, such that the actuator mechanism 362 is appropriately controlled in accordance with the contours of the ground that is about to be processed by the plough, or is being processed by the plough.

In some examples, the ground-contour-data can include stored-contour-data that is representative of ground contour information that is stored in memory, for instance in a database or a look-up table. As indicated above, the stored-contour-data may have been stored in memory as part of an earlier operation in the field or may be determined from existing mapping data. The stored-contour-data may be associated with contour-location-data. In the same way as described above, the controller can use the stored-contour-data, the contour-location-data and plough-location-data in order to determine and provide the actuator-control-signal 366 to the actuator mechanism 362.

It will be appreciated that the above examples of ground contour-data can be combined, such that the sensed-contour-data and/or the stored-contour-data can include lateral-contour-data and/or longitudinal-contour-data.

The controller 360 can be implemented in a number of different ways. For instance, the controller can apply mathematical equations to the received ground-contour-data 364 (and any other data that it processes) in order to determine the actuator-control-signal 366. Alternatively, the controller 360 can use a database or a look-up table to determine an appropriate actuator-control-signal 366 for received ground-contour-data 364 (and any other data that it processes).

Figure 7:
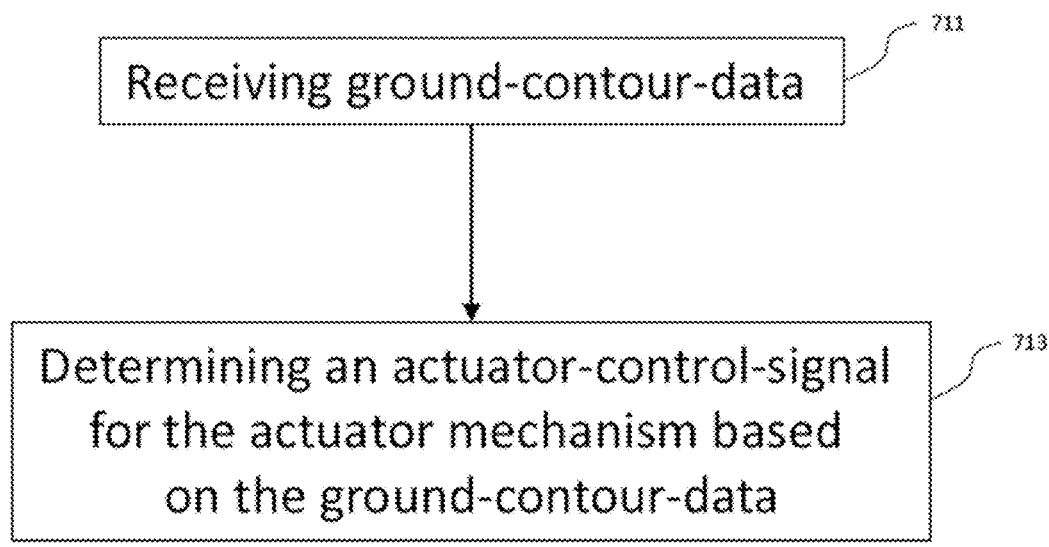
FIG. 7 illustrates an example embodiment of a method of operating a plough.

FIG. 7 illustrates an example embodiment of a method of operating a plough. As described above, the plough includes a frame, a ground engaging tool that is connected to the frame, and an actuator mechanism that can control the roll angle and/or the pitch angle of the frame.

At step 711, the method receives ground-contour-data. As described above, the ground-contour-data is representative of contours of a field that the plough is to work. The contours can relate to parts of the field that are immediately in front of the plough, or are already being processed by the plough. Alternatively, the contours can relate to parts of the field that are to be processed by the plough in a future part of a ploughing operation. For instance, the contours can relate to parts of the field that are in front of a tractor that is towing the plough, or relate to parts of the field that will be processed by the plough in a subsequent run through the field.

At step 713, the method determines an actuator-control-signal for the actuator mechanism based on the ground-contour-data. The actuator-control-signal is for setting the roll angle and/or the pitch angle of the frame, for instance such that it is aligned with the ground that it is processing.

In examples where the ground-contour-data is representative of parts of the field that are to be processed by the plough in a future part of a ploughing operation, the method at step 713 can determine and apply a time-offset before providing the actuator-control-signal to the actuator mechanism, in which case to be processed by the plough. Alternatively, the method can use plough-location-data to determine when to provide the actuator-control-signal to the actuator mechanism.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. A plough comprising:
a frame;
a ground engaging tool that is connected to the frame;
an actuator mechanism configured to control a roll angle of the frame, wherein the actuator mechanism comprises a turning actuator coupled to the frame and to a headstock of the plough, and the turning actuator is configured to rotate the frame about a longitudinal axis relative to the headstock to control the roll angle of the frame; and
a controller configured to:
receive ground-contour-data that is representative of contours of a field that the plough is to work; and
determine an actuator-control-signal for the actuator mechanism based on the ground-contour-data, wherein the actuator-control-signal is for setting the roll angle of the frame.

2. The plough of claim 1, wherein the actuator-control-signal is for setting the roll angle of the frame such that it is aligned with the ground that it is processing.

3. The plough of claim 1, wherein:
the actuator mechanism is configured to set the orientation of the frame relative to a vehicle that is driving the plough; and
the controller is configured to determine the actuator-control-signal also based on vehicle-orientation-data that is representative of the orientation of the vehicle.

4. The plough of claim 3, wherein the vehicle-orientation-data is representative of a roll angle of the vehicle.

5. The plough of claim 1, wherein the ground-contour-data comprises lateral-contour-data that is representative of lateral contours of the ground that is to be processed by the plough, or is already being processed by the plough.

6. The plough of claim 5, wherein the lateral-contour-data comprises averaged contour data.

7. The plough of claim 6, wherein the lateral-contour-data comprises averaged contour data, that is averaged over the width of the plough.

8. The plough of claim 1, wherein the ground-contour-data comprises sensed-contour-data that is representative of sensed parameters that are generated by one or more sensors.

9. The plough of claim 8, wherein the ground-contour-data comprises a sensed-contour-distance-offset that is representative of a distance between (i) the location of the ground contours that are identified by the ground-contour-data and (ii) a predetermined part of the plough, and wherein the controller is configured to:
receive a plough-speed-value, which is representative of a speed of the plough; and
provide the actuator-control-signal to the actuator mechanism at an instant in time that is based on the sensed-contour-distance-offset and the plough-speed-value.

10. The plough of claim 1, wherein the ground-contour-data comprises stored-contour-data that is representative of ground contour information that is stored in memory.

11. The plough of claim 8, wherein the ground-contour-data comprises contour-location-data that is representative of the location of the ground contours that are identified by the ground-contour-data, and wherein the controller is configured to:
receive plough-location-data that is representative of the location of the plough in the field; and
provide the actuator-control-signal to the actuator mechanism based on a comparison of the plough-location-data and the contour-location-data.

12. The plough of claim 1, wherein the actuator mechanism is configured to control a pitch angle of the frame, and the actuator-control-signal is for setting the pitch angle of the frame.

13. A computer-implemented method of operating a plough, the plough comprising:
a frame;
a ground engaging tool that is connected to the frame; and
an actuator mechanism configured to control a roll angle of the frame, wherein the actuator mechanism comprises a turning actuator coupled to the frame and to a headstock of the plough, and the turning actuator is configured to rotate the frame about a longitudinal axis relative to the headstock to control the roll angle of the frame;
wherein the method comprises:
receiving ground-contour-data that is representative of contours of a field that the plough is to work; and
determining an actuator-control-signal for the actuator mechanism based on the ground-contour-data, wherein the actuator-control-signal is for setting the roll angle of the frame.

14. The method of claim 13, wherein the actuator-control-signal is for setting the roll angle of the frame such that it is aligned with the ground that it is processing.

15. A plough comprising:
a frame;
a ground engaging tool that is connected to the frame;
an actuator mechanism configured to control a pitch angle of the frame, wherein the actuator mechanism comprises a depth-wheel-adjustable-linkage configured to control a height of a rear portion of the frame relative to a ground surface; and a controller configured to:
- receive ground-contour-data that is representative of contours of a field that the plough is to work; and
- determine an actuator-control-signal for the actuator mechanism based on the ground-contour-data, wherein the actuator-control-signal is for setting the pitch angle of the frame.

16. The method of claim 15, wherein the actuator mechanism is configured to control a roll angle of the frame, and the actuator-control-signal is for setting the roll angle of the frame.

17. The method of claim 16, wherein the actuator mechanism comprises a turning actuator coupled to the frame and to a headstock of the plough, and the turning actuator is configured to rotate the frame about a longitudinal axis relative to the headstock to control the roll angle of the frame.

18. The plough of claim 12, wherein the actuator mechanism comprises a depth-wheel-adjustable-linkage that is configured to control a height of a rear portion of the frame relative to a ground surface.

\* \* \* \* \*